US012770322B2

(12) United States Patent
Kang

(10) Patent No.: US 12,770,322 B2
(45) Date of Patent: Oct. 20, 2026

(54) METHOD AND APPARATUS WITH TILE-BASED IMAGE RENDERING

(71) Applicant: SAMSUNG ELECTRONICS CO., LTD., Suwon-si (KR)

(72) Inventor: Seok Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 18/680,883

(22) Filed: May 31, 2024

(65) Prior Publication Data

US 2025/0218112 A1 Jul. 3, 2025

(30) Foreign Application Priority Data

Jan. 2, 2024 (KR) ........................ 10-2024-0000278

(51) Int. Cl.
*G06T 15/80* (2011.01)
*G06T 3/4053* (2024.01)
(Continued)

(52) U.S. Cl.
CPC ............ *G06T 15/80* (2013.01); *G06T 3/4053* (2013.01); *G06T 7/90* (2017.01); *G06V 10/56* (2022.01);
(Continued)

(58) Field of Classification Search
CPC ......... G06T 15/80; G06T 3/4053; G06T 7/90; G06T 2207/10024; G06T 2207/20084;
(Continued)

(56) References Cited

U.S. PATENT DOCUMENTS 9,805,447 B2 10/2017 Engh-halstvedt et al.
11,276,211 B2 3/2022 Saleh et al.
(Continued)

FOREIGN PATENT DOCUMENTS

EP 4 220 567 A1 8/2023

OTHER PUBLICATIONS

Anonymous, "Tiling based Super-resolution Convolutional Neural Network for Image Processing", Technical Disclosure Commons, (Oct. 23, 2023) https://www.tdcommons.org/dpubs_series/6348 (Year: 2023).*

(Continued)

*Primary Examiner* — Kee M Tung
*Assistant Examiner* — Xiaoming Wei
(74) *Attorney, Agent, or Firm* — NSIP Law

(57) ABSTRACT

A processor-implemented method included determining first color values of a portion of pixels of plural pixels, the portion of pixels being in a tile frame corresponding to a partial region of an input frame, by performing shading using a shader module on the portion of pixels included, determining second color values of other pixels, the other pixels being pixels of the plural pixels not included in the portion of pixels of the tile frame, by performing neural network-based super-sampling processing on the other pixels, and determining a rendered tile frame including the first color values of the portion of pixels and the second color values of the other pixels, the determining of the first color values of the portion of pixels including determining edge color values of pixels in an edge region by performing shading using the shader module on the pixels in the edge region of the tile frame.

20 Claims, 8 Drawing Sheets

(51) Int. Cl.
*G06T 7/90* (2017.01)
*G06V 10/56* (2022.01)

(52) U.S. Cl.
CPC ............... *G06T 2207/10024* (2013.01); *G06T 2207/20084* (2013.01)

(58) Field of Classification Search
CPC ......... G06T 1/20; G06T 11/40; G06T 15/005; G06T 2200/28; G06T 1/60; G06T 3/40; G06V 10/56
See application file for complete search history.

(56) References Cited

U.S. PATENT DOCUMENTS

| | | | | |
|---|---|---|---|---|
| 11,436,483 | B2 | 9/2022 | Kuo et al. | |
| 11,526,964 | B2 | 12/2022 | Pohl et al. | |
| 2021/0390664 | A1* | 12/2021 | Pohl | G06T 11/40 |
| 2022/0036632 | A1 | 2/2022 | Krisch et al. | |
| 2023/0102620 | A1 | 3/2023 | Fainstain et al. | |
| 2023/0206394 | A1* | 6/2023 | Janis | G06T 3/18 345/595 |
| 2025/0111602 | A1* | 4/2025 | Croxford | G06T 11/40 |

OTHER PUBLICATIONS

Hollander et al. Journal of Computer Graphics Techniques, "Adaptive Supersampling for Deferred Anti-Aliasing", vol. 2, No. 1, 2013 http://jcgt.org (Year: 2013).*

Extended European Search Report issued on Mar. 6, 2025, in counterpart European Patent Application No. 24199511.7. (9pages in English).

Guo, Jie, et al. "ExtraNet: real-time extrapolated rendering for low-latency temporal supersampling." ACM Transactions on Graphics (TOG) 40.6, Article 278, Dec. 2021. (pp. 1-16).

* cited by examiner

METHOD AND APPARATUS WITH TILE-BASED IMAGE RENDERING

CROSS-REFERENCE TO RELATED APPLICATIONS

This application claims the benefit under 35 USC § 119(a) of Korean Patent Application No. 10-2024-0000278, filed on Jan. 2, 2024, in the Korean Intellectual Property Office, the entire disclosure of which is incorporated herein by reference for all purposes.

BACKGROUND

1. Field

The following description relates to a method and apparatus with tile-based image rendering.

2. Description of Related Art

Graphics processing systems may include a plurality of processing units such as graphics processing units (GPUs) to obtain a performance gain through parallel processing of graphics tasks. The plurality of GPUs may be used to render images. Rendering is a technology for obtaining a final result of one or more objects in an image that are finished in consideration of their external environment such as a position of an object or lighting within the image, and is also known as image synthesis.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method included determining first color values of a portion of pixels of plural pixels, the portion of pixels being in a tile frame corresponding to a partial region of an input frame, by performing shading using a shader module on the portion of pixels included, determining second color values of other pixels, the other pixels being pixels of the plural pixels not included in the portion of pixels of the tile frame, by performing neural network-based super-sampling processing on the other pixels, and determining a rendered tile frame including the first color values of the portion of pixels and the second color values of the other pixels, the determining of the first color values of the portion of pixels including determining edge color values of pixels in an edge region by performing shading using the shader module on the pixels in the edge region of the tile frame.

The determining of the first color values may include determining non-edge color values of a non-edge portion of pixels in a non-edge region by performing shading using the shader module on the non-edge portion of pixels, the non-edge portion of pixels being included in the non-edge region, and the non-edge region being a region other than the edge region of the tile frame.

The determining of the second color values may include performing the super-sampling processing based on the edge color values and the non-edge color values.

The determining of the second color values may include performing the super-sampling processing without using a third color value of a pixel included in another tile frame positioned around the tile frame.

The determining of the edge color values may include determining all-edge color values of all pixels in the edge region by performing the shading using the shader module on the all pixels included in the edge region.

A number of the non-edge portion of pixels to be shaded using the shader module is determined based on one of an image upscaling ratio, a frame rate, or an estimated amount of resource consumption.

The method may include, after the second color values are determined, transmitting the rendered tile frame including the first color values and the second color values to a system memory.

The determining of the first color values may be performed by the shader module included in a graphics processing unit (GPU) and the determining of the second color values may be performed by a super-sampler module configured to perform the super-sampling processing.

The super-sampler module may be included in the GPU.

In a general aspect, here is provided a non-transitory computer-readable storage medium storing instructions that, when executed by a processor, cause the processor to perform the method.

In a general aspect, here is provided an electronic apparatus including a control processor and a graphics processing unit (GPU) configured to perform image rendering based on control of the control processor, the GPU including processors configured to execute instructions and a memory storing the instructions, execution of the instructions configures the processors to determine first color values of a first portion of pixels, the first portion of pixels being pixels of plural pixels in a tile frame corresponding to a partial region of an input frame, by performing shading on the first portion of pixels and determine second color values of second pixels, the second portion of pixels being pixels of the plural pixels not included in the first portion, by performing neural network-based super-sampling processing on the second portion of pixels, and a graphics memory configured to store a rendered tile frame including the first color values of the first portion of pixels and the second color values of the second portion of pixels, and the determining of the first color values includes determining edge color values of pixels in an edge region by performing shading on the pixels in the edge region of the tile frame.

The determining of the first color values may include determining non-edge color values of a third portion of pixels in a non-edge region by performing shading on the third portion of pixels, the non-edge region being a region other than the edge region of the tile frame.

The determining of the second color value may include determining the second color values by performing the super-sampling processing based on the edge color values and the non-edge color values.

The determining of the second color value may include performing the super-sampling processing without using a third color value of a pixel included in another tile frame positioned around the tile frame.

The determining of the second color value may include determining all-edge color values of all pixels in the edge region by performing the shading on the all pixels included in the edge region.

The electronic apparatus may include a system configured to receive the tile frame rendered by the electronic apparatus from the graphics memory, and store an output frame obtained by combining rendered tile frames.

In a general aspect, here is provided an electronic apparatus including a graphics processing unit (GPU) including processors configured to execute instructions and a memory storing the instructions, execution of the instructions configuring the processors to determine first color values of a first portion of pixels by performing shading on the first portion of pixels, the first portion of pixels being pixels of plural pixels included in a tile frame corresponding to a partial region of an input frame and determine second color values of a second portion of pixels, the second portion of pixels being pixels of the plural pixels not included in the first portion, by performing neural network-based super-sampling processing on the second portion of pixels, and a first graphics memory configured to store the determined color values of the portion of pixels, a second graphics memory configured to store the determined color values of the second portion of pixels, and a system memory connected to the first graphics memory and the second graphics memory, the determining of the first color values including determining edge color values of pixels in an edge region by performing shading on the pixels in the edge region of the tile frame.

The determining of the first color values may include determining non-edge color values of a third portion of pixels in a non-edge region by performing shading on the third portion of pixels of pixels, the non-edge region being a region other than the edge region of the tile frame.

The determining of the second color value may include determining the second color values by performing the super-sampling processing based on the edge color values and the non-edge color values.

The system memory may be configured to store a rendered tile frame including the first color values and the second color values.

Figure 1:
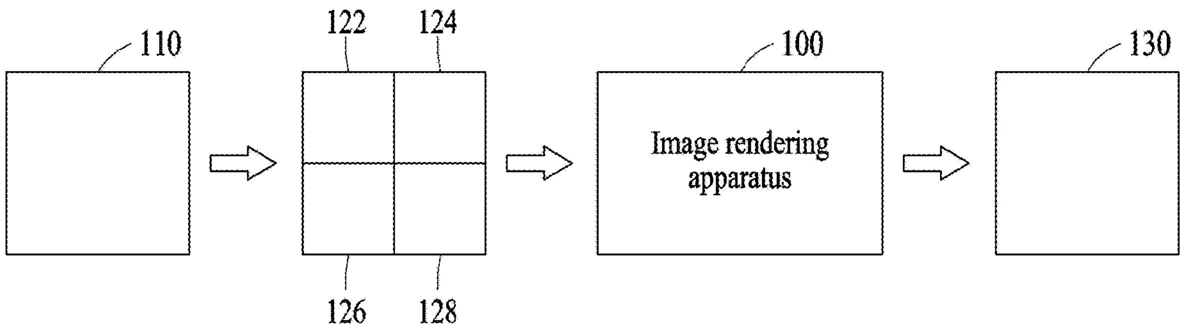
FIG. 1 illustrates an example image rendering apparatus that performs tile-based image processing according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

When a CNN is used for the neural network-based super-sampling processing, a dimension of an output may be reduced compared to a dimension of an input due to the characteristics of a convolution operation in the CNN. When the dimension of the output is reduced, the number of pixels included in the output is reduced than the number of pixels included in the input. The CNN may include a plurality of convolutional layers, in which a convolution operation is performed, and as more convolutional layers are included, a larger dimension of input than the dimension of the output is required. A typical method of setting the dimensions of the input to be identical to the output of the CNN has been to make the dimension of the input larger than a dimension of an original input by adding a padding area to the input. However, as the padding area does not include any meaningful value, the typical method of adding the padding area may cause a degradation of quality at a boundary portion of the output. In order to perform the super-sampling processing on a single tile frame using a CNN, an input that is larger than the tile frame may be required for the reasons described above. Another typical method may include a tile frame that is a target of the image processing as well as some of tile frames around the corresponding time frame being selected as the input for the CNN. In this typical method, there has been a limitation where it was necessary to wait until the shading for all of the surrounding frames to be completed in order to perform the super-sampling processing on the corresponding tile frame, leading to a lengthy processing time.

FIG. 1 illustrates an example image rendering apparatus that performs tile-based image processing according to one or more embodiments.

Referring to FIG. 1, in a non-limiting embodiment, for an image rendering apparatus 100, when an input frame 110 is given, the input frame 110 may be divided into a plurality of tile frames 122, 124, 126, and 128. The input frame 110 may include an image to be rendered. Each of the tile frames 122, 124, 126, and 128 may correspond to a portion or a partial region of the input frame 110. Herein, the "tile frame" may also be referred to as a "tile" or a "tile region". The number of tile frames generated by dividing the input frame 110 is more than one. For ease of description, FIG. 1 illustrates an example in which the input frame 110 is divided into the four tile frames 122, 124, 126, and 128, however, the number of tile frames generated by dividing the input frame 110 is not limited to any particular number. A shape of the tile frames 122, 124, 126, and 128 may be a rectangle having a predetermined size (e.g., 16×16 pixels or 32×32 pixels). The sizes and shapes of the tile frames 122, 124, 126, and 128 may be identical to each other, but are not limited thereto. In an example, the tile frames 122, 124, 126, and 128 may not be identical in size and/or shape. The dividing of the input frame 110 into the tile frames 122, 124, 126, and 128 may be performed by the image rendering apparatus 100, or may be performed by a processor not included in the image rendering apparatus 100.

In an example, the tile frames 122, 124, 126, and 128 may be transferred to the image rendering apparatus 100. The image rendering apparatus 100 may perform image processing (e.g., rendering) on the tile frames 122, 124, 126, and 128, and generate an output frame 130 as a result of performing the image processing. A amount of memory required by the image processing may be reduced by performing the image processing in the unit of tile frames without processing the input frame 110 all at once. The image processing to be performed on each of the tile frames 122, 124, 126, and 128 may be performed sequentially or in parallel. The image rendering apparatus 100 may include a graphics processing unit (GPU) to perform the image processing on the tile frame. A GPU may be a specialized electronic circuit designed to accelerate the processing of images. When the image rendering apparatus 100 includes a plurality of GPUs, the GPUs may perform the image processing on the tile frames in parallel. The parallel processing may increase a speed of the image processing.

The image rendering apparatus 100 may perform rendering in the unit of tile frame. In an example, when the image rendering apparatus 100 performs the rendering on the tile frame 122, the tile frame 122 may be allocated to a graphics memory (e.g., a graphics memory 729 of FIG. 7, a first graphics memory 828 or a second graphics memory 838 of FIG. 8) included in the image rendering apparatus 100, and the image rendering apparatus 100 may determine color values of pixels included in the tile frame 122 by performing shading on the tile frame 122 by a shader module (e.g., a shader module 723 of FIG. 7 or a shader module 824 of FIG. 8) of the GPU and neural network-based super-sampling processing. Here, the color value may be determined by performing rendering.

In an example, the shader module may include a vertex shader, geometric shader, and/or pixel shader that perform shading. Shading may represent an operation of determining a shading value (or an illuminance value) of an object surface according to a position, direction, and/or color of an illumination when calculating a color of the object surface shown in an image in rendering in the field of computer graphics. Through the shading, color values of pixels included in an object surface may be determined.

In an example, the super-sampling processing may represent processing of converting a low-resolution image into a high-resolution image. Through the super-sampling processing, an image may be upscaled to a higher resolution. Instead of the color values for all pixels included in a tile frame being determined by the shader module of the GPU, the color value of some pixels included in the tile frame may be determined by the shader module, and color values of the remaining pixels may be determined by the super-sampling processing. The neural network-based super-sampling processing may represent an operation of performing the super-sampling processing using a trained neural network (e.g., a convolutional neural network (CNN)). Through the neural network-based super-sampling processing, color values of pixels included in an object surface may be determined at a higher speed with lower power consumption, compared to a case of performing the shading using the GPU.

In an example, the rendered tiles may be combined to generate the output frame 130, and the generated output frame 130 may be output through a display. A next input frame of the input frame 110 may be divided into tile frames and subjected to the image processing by the image rendering apparatus 100 as described above to generate a next output frame, and the generated next output frame may be output through the display. These processes may be performed on each the input frames sequentially. The next input frame represents an input frame processed after the input frame 110 is processed temporally, and the next output frame represents an output frame generated after the output frame 130 is generated temporally.

In an example, which will be described below in greater detail, the image rendering apparatus 100 may divide the entire region of the tile frame into an edge region and a non-edge region. In an example, the image rendering apparatus 100 may perform shading on all pixels included in the edge region and some pixels included in the non-edge region by the shader module, and perform the super-sampling processing on the remaining pixels included in the non-edge region. A dimension of the non-edge region is smaller than a dimension of the entire region of the tile frame. As described above, an output of a neural network performing the super-sampling processing becomes smaller than a dimension of an input, however, in a case where the entire region of the tile frame is input to the neural network, the output of the neural network may have a dimension that is the same as the dimension of the non-edge region, or a dimension that is smaller than the dimension of the entire region of the tile frame but larger than that of the non-edge region. Through the above method, it is possible to perform the super-sampling processing on a tile frame without using surrounding tile frames. In an example, when surrounding tile frames are not used, a processing flow of image rendering may be simplified, a processing speed is increased, and the amount of resources required for processing (e.g., a memory or power) may be reduced.

Figure 2:
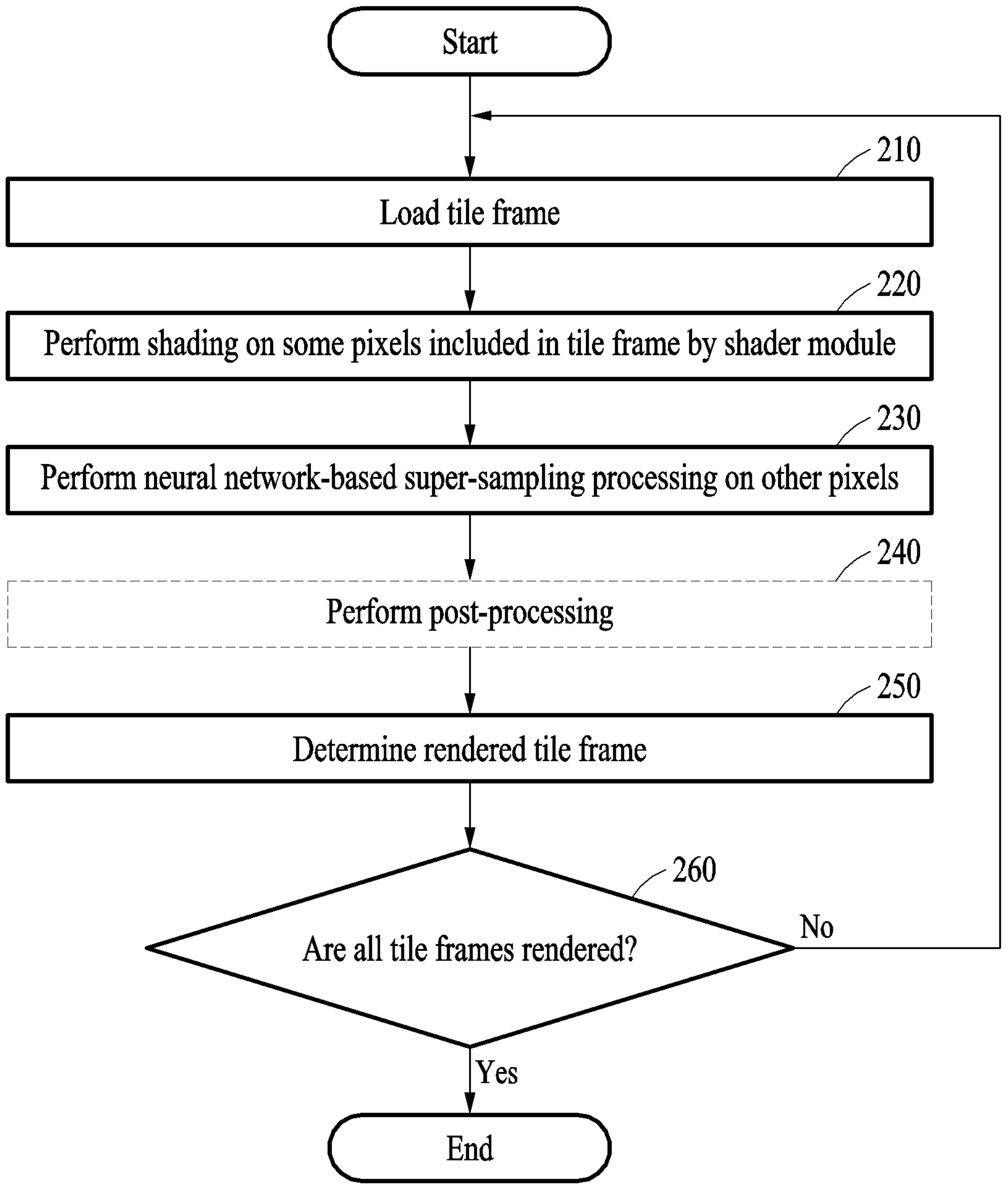
FIG. 2 illustrates an example tile-based image rendering method according to one or more embodiments.

FIG. 2 illustrates an example of operations of a tile-based image rendering method according to one or more embodiments. In an example, the operations of FIG. 2 may be simultaneously or parallelly performed with one another, and the order of the operations may be changed. In addition, some of the operations may be omitted or another operation may be additionally performed. An image rendering method may be performed by an image rendering apparatus (e.g., the image rendering apparatus 100 of FIG. 1) as described in greater detail above.

Referring to FIG. 2, in a non-limiting example, in operation 210, the image rendering apparatus may load a tile frame. A tile frame that is a target of rendering may be allocated to a graphics memory, and the image rendering apparatus may load the tile frame from the graphics memory. The image rendering apparatus may schedule rendering of multiple tile frames that configure a single input frame, and allocate a tile frame to be rendered to the graphics memory according to a scheduling result.

In an example, in operation 220, the image rendering apparatus may determine color values of some pixels by performing shading on the some pixels included in a tile frame corresponding to a partial region of an input frame by a shader module. The operation of determining the color values of the some pixels may be performed by a shader module (e.g., the shader module 723 of FIG. 7 or the shader module 824 of FIG. 8 as described in greater detail below) included in a GPU. A pre-processed tile frame may be generated by performing the shading.

The image rendering apparatus may perform the shading on pixels in an edge region of a tile frame by the shader module to determine color values of the pixels in the edge region. In an example, the image rendering apparatus may perform the shading on all pixels included in the edge region by the shader module to determine color values of all pixels in the edge region. The image rendering apparatus may perform the shading on some pixels among pixels included in a non-edge region other than the edge region in the tile frame by the shader module to determine color values of the some pixels in the non-edge region.

In an example, the number of some pixels in the non-edge region to be shaded by the shader module may be determined based on at least one of an image upscaling ratio, a frame rate, or an estimated amount of resource consumption (e.g., an estimated amount of power consumption). In an example, as the image upscaling ratio, the frame rate, or the estimated amount of resource consumption increases, the number of a portion of pixels in the non-edge region to be shaded by the shader module may decrease. As the image upscaling ratio, the frame rate, or the estimated amount of resource consumption decreases, the number of a portion of the pixels in the non-edge region that will be shaded by the shader module may increase.

As described above, the image rendering apparatus may generate a pre-processed tile frame having different resolutions for respective regions by performing the shading with different resolutions for respective regions (the edge region and the non-edge region) in the tile frame.

In an example, in operation 230, the image rendering apparatus may perform the neural network-based super-sampling processing on other pixels in the non-edge region other than the portion of shaded pixels among all pixels included in the tile frame to determine color values of the other pixels. The operation of determining the color values for the other pixels may be performed by the super-sampler module (e.g., the super-sampler module 727 of FIG. 7 or the super-sampler module 834 of FIG. 8) that performs the super-sampling processing. In an example, the super-sampler module may operate in a GPU, or may operate in a separate device other than a GPU.

The image rendering apparatus may perform the super-sampling processing based on the color values of the pixels in the edge region and the color values of the portion of pixels in the non-edge region to determine the color values of other pixels in the non-edge region (pixels with color values that are not determined by shading by the shader module). The image rendering apparatus may perform the super-sampling processing without using color values of pixels included in other tile frames located around the tile frame.

A neural network that performs the super-sampling processing may be, for example, a CNN. The CNN may perform the neural network-based super-sampling processing on the non-edge region corresponding to a low-resolution region in the pre-processed tile frame using the pre-processed tile frame shaded in operation 220 as an input, to output a tile frame including a non-edge region with a high resolution. The CNN may perform the super-sampling processing to determine rendered color values of pixels in the non-edge region with color values not determined by shading.

If desired, in an example, in operation 240, the image rendering apparatus may perform rendering post-processing. When no rendering post-processing is selected or desired, operation 240 may be omitted. The rendering post-processing may include, for example, rearranging pixels in a tile frame, limiting a color value of a rendered pixel within a specific image range, adding a text to a pixel frame, filtering, adjusting brightness, and/or adjusting chroma.

In an example, in operation 250, the image rendering apparatus may determine a rendered tile frame including color values of the portion of pixels determined by performing the shading and color values of other pixels determined by performing the super-sampling processing. After the color values of all of the other pixels are determined by the super-sampling processing, the rendered tile frame including the color values of the portion of pixels determined by the performing the shading and the color values of the other pixels determined by performing the super-sampling processing may be transferred to a system memory (e.g., a system memory 730 of FIG. 7 or a system memory 840 of FIG. 8 as discussed in greater detail below).

In operation 260, in an example, the image rendering apparatus may determine whether all of the tile frames are rendered. When the rendering has not been completed for all of the tile frames that configure the input frame (in a case of "No" in operation 260), the image rendering apparatus may perform operations 210 to 260 with respect to a next tile frame.

According to the example described above, the shading by the shader module, the super-sampling processing, and the rendering post-processing may be performed on a single tile frame continuously without depending on another tile frame. It is not necessary to fetch data from a neighboring tile frame for the rendering of the tile frame, and thus, the power consumed for memory access may be reduced.

Figure 3:
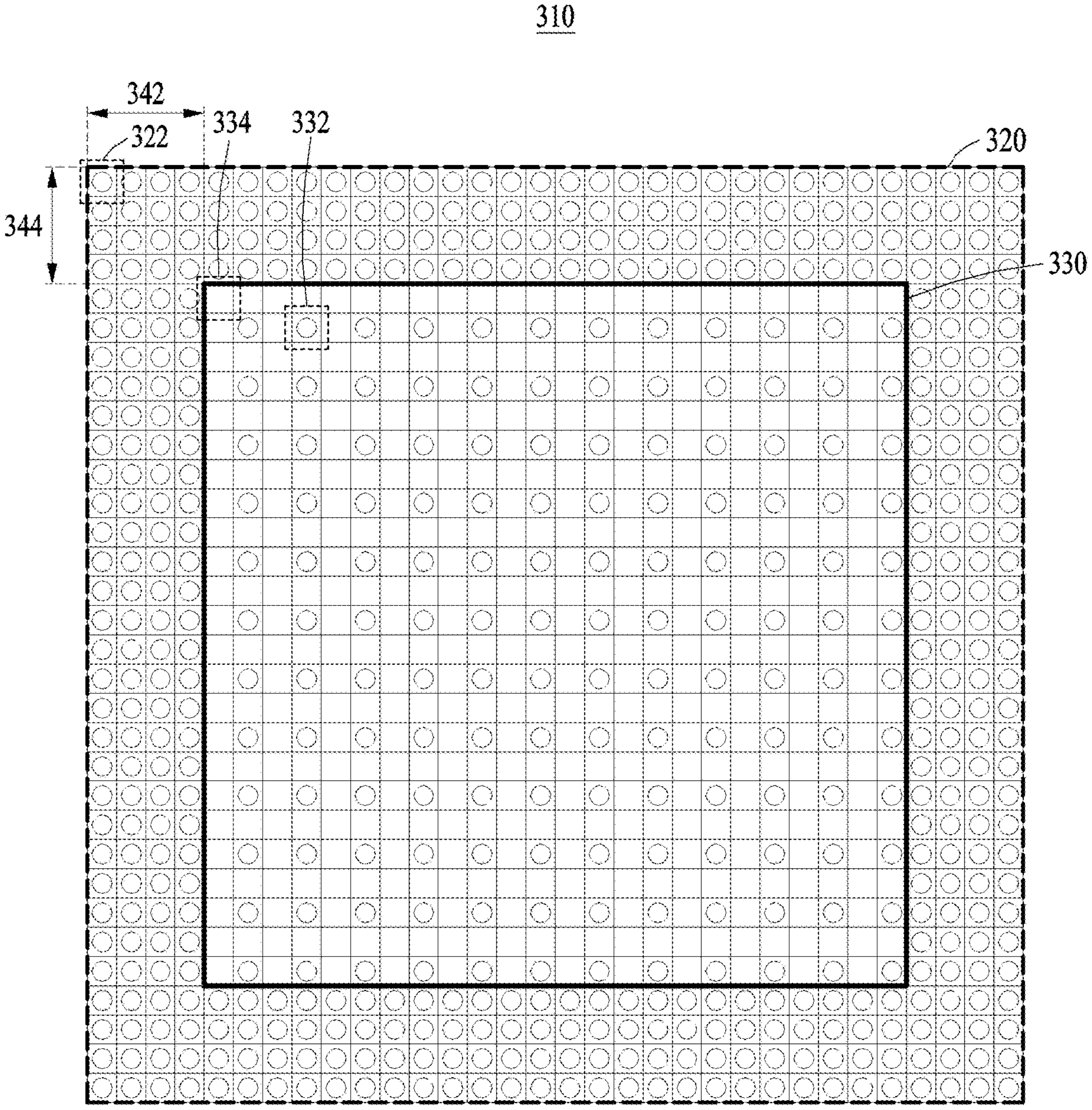
FIG. 3 illustrates an example of a tile frame shaded by a shader module according to one or more embodiments.

FIG. 3 illustrates an example of a tile frame shaded by a shader module according to one or more embodiments. Referring to FIG. 3, in a non-limiting example, a tile frame 310 may be shaded. The tile frame 310 may correspond to, for example, one of the tile frames 122, 124, 126, and 128 of FIG. 1, that is shaded by a shader module of a GPU. The tile frame 310 may include a plurality of pixels that is the basic unit to form a digital image. In the tile frame 310, each grid area may correspond to a single pixel area. The illustrated tile frame 310 has a size of 32×32 and includes 1024 pixels.

Shading processing by the shader module may be performed differently for each area in the tile frame 310. In an example, the shading processing may be performed by the shader module for all of pixels 322 included in an edge region that corresponds to a region between an outer boundary 320 and an inner boundary 330 of the tile frame 310. The shading processing using the shader module may be performed for a portion of pixels 332 of the pixels included inside the inner boundary 330, and the shading processing using the shader module may not be performed for remaining pixels 334 except for the portion of pixels 332. Among the pixels included in the illustrated tile frame 310, the pixels 322 and 332 denoted as "O" may represent pixels that are shaded by the shader module to determine color values thereof.

In an example, the edge region may have a horizontal thickness (or depth) 342 and a vertical thickness (or depth) 344, and the horizontal thickness 342 and the vertical thickness 344 may be determined based on a neural network used for the super-sampling processing. In an example, the horizontal thickness 342 and the vertical thickness 344 may be determined in consideration of the number of convolution processing performed during the operation of the neural network. The convolution processing may be performed by the convolutional layers included in the neural network. As the number of convolution processing performed increases, the horizontal thickness 342 and the vertical thickness 344 may gradually become thicker. The horizontal thickness 342 and vertical thickness 344 are required to have thicknesses that do not cause a problem in determining a pixel value of the pixel 334, even if the size of the tile frame input to the neural network is gradually reduced by the convolution processing during the super-sampling processing. In an example, assuming that the convolution processing with a kernel size of 3×3 is performed four times during the super-sampling processing, the horizontal thickness 342 and vertical thickness 344 each need to have a thickness of at least four or more pixels. The horizontal thickness 342 and vertical thickness 344 may be defined such that color values of shaded pixels required for the super-sampling processing are all present in the pixel frame 310.

Figure 4:
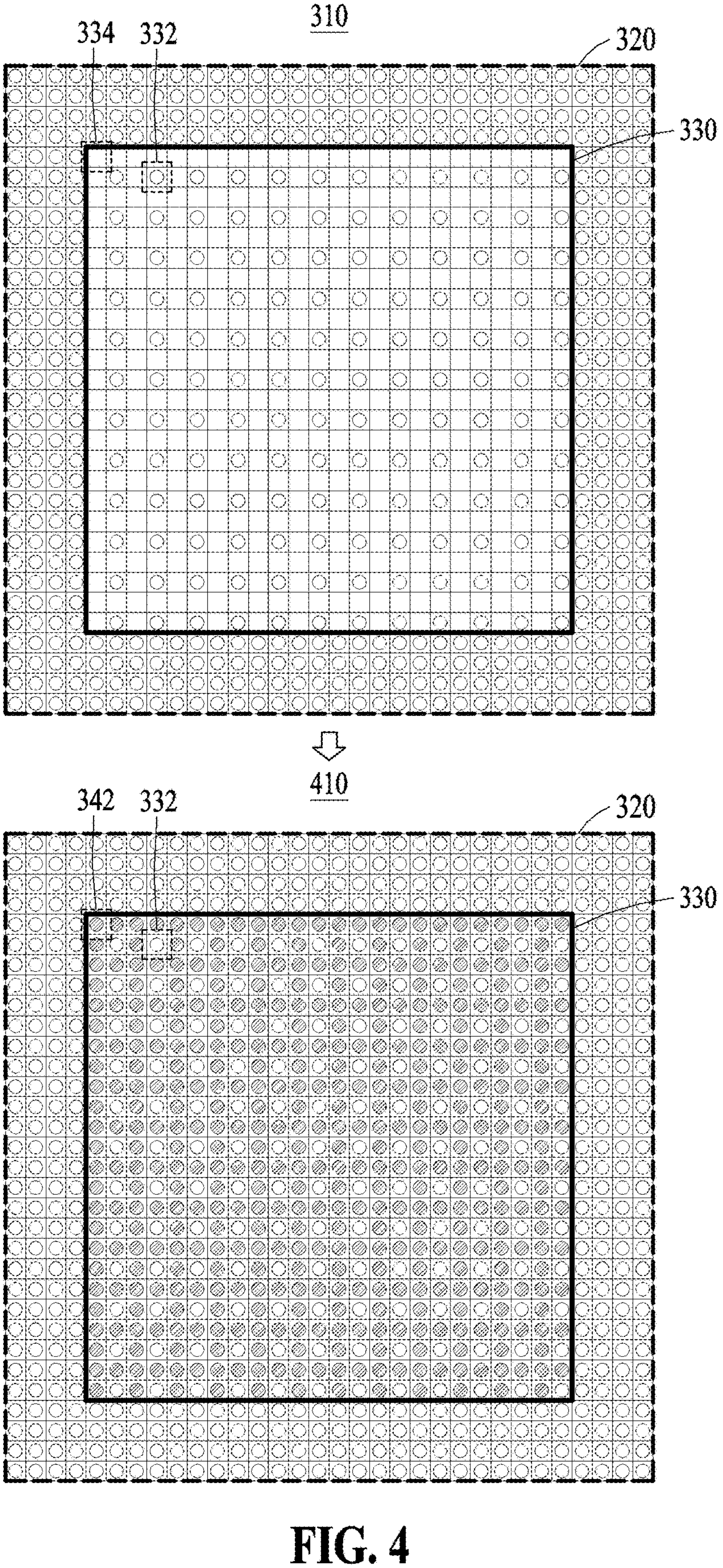
FIG. 4 illustrates an example of a tile frame super-sampled by a super-sampler module according to one or more embodiments.

FIG. 4 illustrates an example of a tile frame super-sampled by a super-sampler module according to one or more embodiments.

Referring to FIG. 4, in a non-limiting embodiment, a pre-processed tile frame 310 that is shaded by a shader module may be input to a neural network that performs super-sampling processing, and a tile frame 410 may be generated through neural network-based super-sampling processing. The neural network-based super-sampling processing may be performed on the other pixels 334 not shaded in a non-edge region, other than the portion of shaded pixels (the pixels 322 in the edge region and the pixels 332 in the non-edge region) among all of the pixels included in the preprocessed tile frame 310. Color values of the other pixels 334 in the non-edge region may be determined through the super-sampling processing. Among the pixels included in the illustrated tile frame 410, the pixels 342 with shaded circles represent pixels that are subjected to the neural network-based super-sampling processing to determine the color values thereof.

In an example, the super-sampling processing may be performed independently for each tile frame, and the shading using the shader module and the neural network-based super-sampling processing may be continuously performed on a tile frame. Color values of all of pixels included in a tile frame may be determined through the shading using the shader module and the neural network-based super-sampling processing. In an example, rendering that is performed by combining the shading and the super-sampling processing may reduce power consumption compared to performing the rendering the entire region of the tile frame only by the shading. In addition, since data of other tile frames are not required to perform the super-sampling processing, the scheduling for the tile frame becomes simple, and the required amount of memory may be reduced because a memory for storing data of surrounding tile frames is not required.

Figure 5:
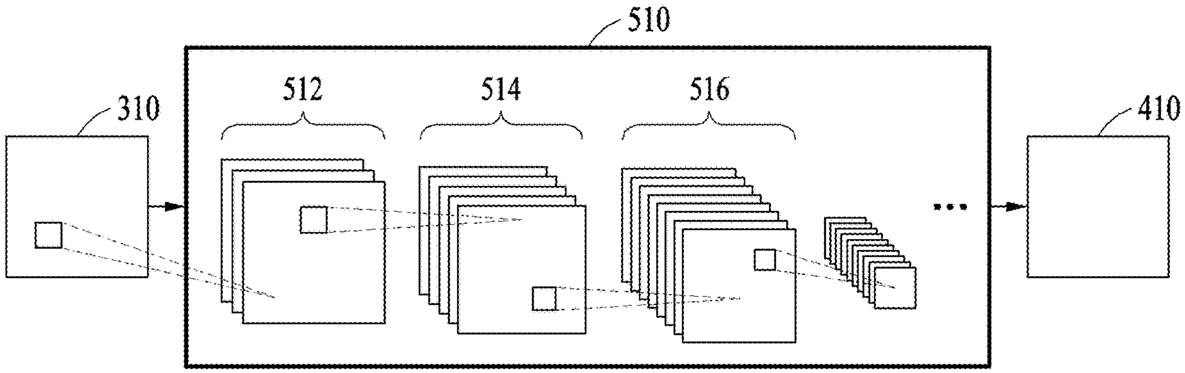
FIG. 5 illustrates an example neural network used for super-sampling processing according to one or more embodiments.

FIG. 5 illustrates an example neural network used for super-sampling processing according to one or more embodiments.

Referring to FIG. 5, in a non-limiting example, the tile frame 310 that is shaded by the shader module may be input to a neural network 510. The neural network 510 may be a CNN including convolutional layers 512, 514, and 516. A convolution operation may be performed in the convolutional layers. The neural network 510 may further include a depth-to-space layer in addition to the convolutional layers 512, 514, and 516. In the depth-to-space layer, data in a depth dimension may be replaced with a block of two-dimensional (2D) spatial data. The depth-to-space layer may be placed after the convolutional layers 512, 514, and 516, and direct resolution conversion may occur in the depth-to-space layer. In the neural network 510, the number of output channels in each layer may be increased or decreased by adjusting the number of filters included in the neural network 510. The super-sampling processing may be performed by increasing the number of output channels as required in the upscaling for the super-sampling, and changing data output from the output channels into a width and height of a frame in the depth-to-space layer.

The neural network 510 may determine color values for pixels that are not shaded in the tile frame 310 through the super-sampling processing. The pixels with color values that are determined through the shading may be combined with the pixels with color values which were determined through the super-sampling processing to determine the rendered tile frame 410.

Super-sampling processing is a graphics processing technology for generating a high-resolution image (or frame) from a low-resolution image (or frame). In neural network-based super-sampling processing, the neural network 510 is used instead of using a predetermined formula for interpolation for super-sampling. In an example, the neural network 510 for super-sampling processing may have been trained through a training process. In the training process, a weight of the neural network 510 may be updated by inputting a low-resolution image (or frame) for training to the neural network 510 to obtain a high-resolution output image from the neural network 510, and minimizing a difference between the obtained high-resolution output image and a reference high-resolution image. These training processes may be performed for a large number of low-resolution images for training, and the trained neural network may be used to generate a high-resolution output image based on a low-resolution image given during an inference process.

In an example of the training process, a training tile frame in which the shading is performed only for pixels in an edge region and a portion of pixels in a non-edge region, as in the tile frame 310, may be input to the neural network 510, and the neural network 510 may generate a rendered tile frame by performing super-sampling processing on the input training tile frame. A difference in quality between the rendered tile frame generated based on the super-sampling processing of the neural network 510 and a rendered tile frame derived by performing shading using the shader module on all pixels of the tile frame may be measured, and parameters (e.g., a connection weight between neurons and bias of neuron) of the neural network 510 may be updated in order to reduce the measured difference in quality. The updating of the parameters may be performed using an error backpropagation algorithm. In the error backpropagation algorithm, the parameters of the neural network 510 may be updated such that a loss calculated using a loss function is reduced.

Figure 6:
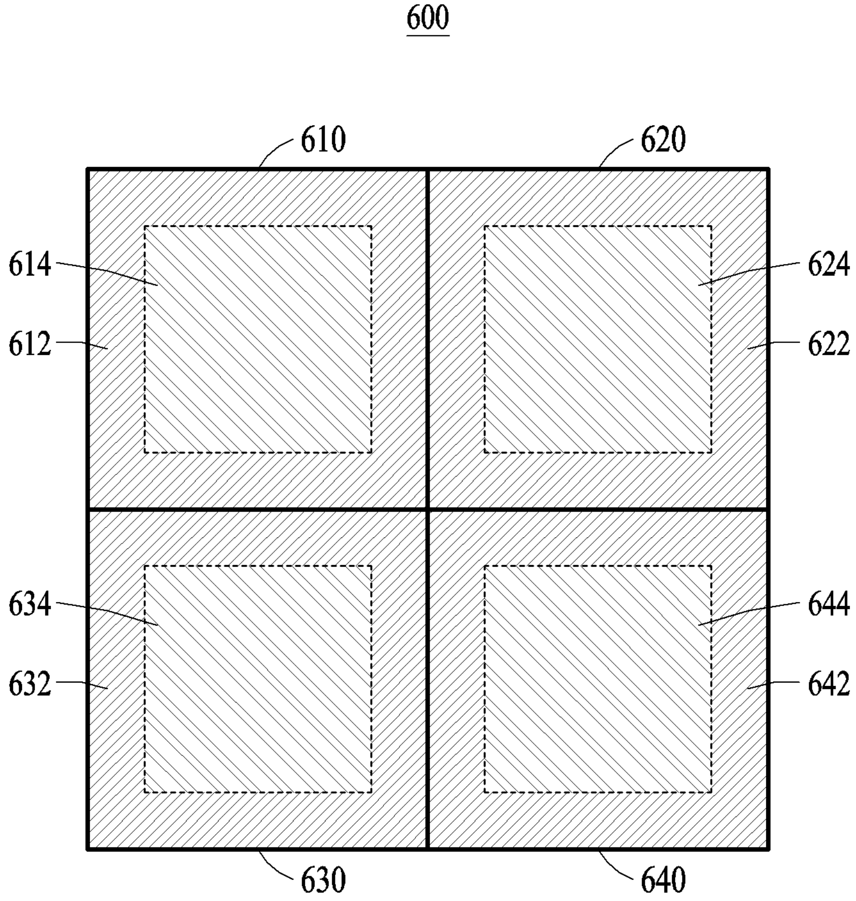
FIG. 6 illustrates an example of an output frame generated by image processing of an image rendering apparatus according to one or more embodiments.

FIG. 6 illustrates an example output frame generated by image processing of an image rendering apparatus according to one or more embodiments.

Referring to FIG. 6, in a non-limiting example, an output frame 600 may have a structure in which rendered tile frames are combined. In an example, the operations of the image rendering method described above in greater detail with reference to FIG. 2 may be performed on each of the tile frames 122, 124, 126, and 128 of FIG. 1 to generate rendered tile frames 610, 620, 630, and 640, and the rendered tile frames 610, 620, 630, and 640 may be combined with each other again in the arranged order of the tile frames 122, 124, 126, and 128 to generate the output frame 600.

Each of edge regions 612, 622, 632, and 642 of the rendered tile frames 610, 620, 630, and 640 corresponds to a region that is shaded for a high resolution by the shading using the shader module. Each of non-edge regions 614, 624, 634, and 644 of the rendered tile frames 610, 620, 630, and 640 corresponds to a region in which a portion of pixels are shaded by the shader module and remaining pixels are super-sampled based on a neural network.

Figure 7:
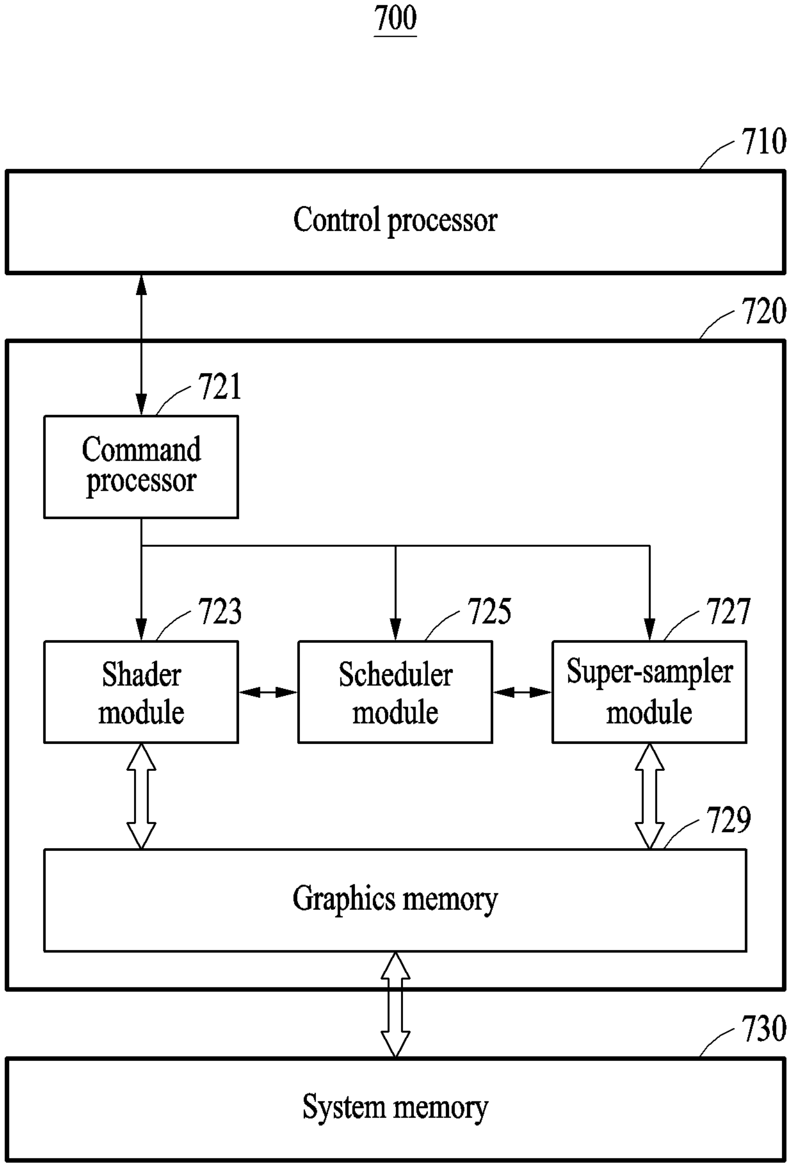
FIG. 7 illustrates example configurations of an image rendering apparatus according to one or more embodiments.

FIG. 7 illustrates example configurations of an image rendering apparatus according to one or more embodiments.

Referring to FIG. 7, in a non-limiting example, an electronic apparatus 700 (e.g., and image rendering apparatus, such as the image rendering apparatus 100 of FIG. 1) may include a control processor 710, and a GPU 720 configured to perform image rendering based on the control of the control processor 710. Shading and super-sampling processing in the image rendering apparatus may be performed in the same GPU 720. The image rendering apparatus may include one or more GPUs 720. In an example, some of the components may be omitted from the image rendering apparatus or another component may be added to the image rendering apparatus.

In an example, the control processor 710 may control the GPU 720. The control processor 710 may transmit a rendering-related command to the GPU 720. A rendering-related command may include a command to implement a specific graphics processing task, for example, a command to indicate the GPU 720 to render a specific input frame. A command may include information about a resolution of an output frame, image content, and/or a color of an image. The control processor 710 may also be referred to as a host processor.

In an example, the control processor 710 may include a central processing unit (CPU). The control processor 710 may execute software (e.g., a program) to control a component (e.g., a hardware or software component) of the image rendering apparatus connected to the control processor 710, and may perform a variety of data processing or operations. The control processor 710 may also be implemented as a system on chip (SoC) or an integrated circuit (IC) that performs processing.

The GPU 720 may render an input frame in the unit of tile frames. In an example, the GPU 720 may execute a series of processing tasks in a "graphics pipeline" to convert an input frame including an image into an output frame that may be rendered on a display. A graphics pipeline may include performing a rendering operation on an object in an image space, transforming and rasterizing the object in an image scene, and generating a 2D rendered image that is suitable to be reproduced by display pixels.

The GPU 720 may include a command processor 721, a shader module 723, a scheduler module 725, a super-sampler module 727, and a graphics memory 729.

The command processor 721 may process a command received from the control processor 710 and control the execution of the command in the GPU 720. The command processor 721 may analyze the received command and distribute rendering-related tasks to the shader module 723, the scheduler module 725, and/or the super-sampler module 727 based on a result of the analyzing.

The shader module 723 may perform shading on a tile frame to generate a pre-processed tile frame (e.g., the tile frame 310 of FIGS. 3 and 4). The shader module 723 may determine a color value of a pixel by shading on a tile frame selected by the scheduler module 725. In an example, the shader module 723 may perform a rendering task according to the graphics pipeline. The shader module 723 may include a vertex shader that adjusts a characteristic of a primitive for each vertex, and a pixel shader that adjusts a pixel value of each pixel before transmitting pixel data to a display or adjusts applying a texture to the primitive. The shader module 723 may further include a geometry shader that generates a new set of primitives using an output of the vertex shader, and a compute shader that executes computational tasks.

The shader module 723 may determine color values of a portion of pixels by performing shading on the portion of pixels included in a tile frame corresponding to a partial region of an input frame. The shader module 723 may perform the shading on pixels in an edge region of a tile frame to determine color values of the pixels in the edge region. In an example, the shader module 723 may perform the shading on all pixels included in the edge region by the shader module 723 to determine color values of all pixels in the edge region. The shader module 723 may perform the shading on a portion of pixels among pixels included in a non-edge region other than the edge region in the tile frame to determine color values of the portion of pixels in the non-edge region. As described above, the shader module 723 may perform shading with different resolutions for each of the edge region and the non-edge region in the tile frame to generate a pre-processed tile frame having different resolutions in the edge region and the non-edge region.

The scheduler module 725 may schedule a tile frame to be shaded by the shader module 723 and a tile frame to be super-sampled by the super-sampler module 727. The scheduler module 725 may control the processing order of tile frames. The scheduler module 725 may select a tile frame that may be processed by the shader module 723 and/or the super-sampler module 727 by checking states of tile frames to be rendered, and transmit information about the selected tile frame to the shader module 723 and the super-sampler module 727.

In an example, the super-sampler module 727 may perform super-sampling processing on the pre-processed tile frame that is shaded by the shader module 723. The super-sampler module 727 may generate a tile frame (e.g., the tile frame 410 of FIG. 4) that is super-sampled by using the pre-processed tile frame as an input. The super-sampler module 727 may perform neural network-based super-sampling processing on other pixels in the non-edge region other than the portion of pixels that are shaded, among all pixels included in the tile frame to determine color values of the other pixels. The super-sampler module 727 may perform the super-sampling processing based on the color values of the pixels in the edge region and the color values of a portion of pixels in the non-edge region to determine the color values of other pixels in the non-edge region (pixels with color values that are not determined by shading by the shader module). The super-sampler module 727 may perform the super-sampling processing without using color values of pixels included in other tile frames located around the tile frame.

The graphics memory 729 may store data of a tile frame. The graphics memory 729 may function as a buffer, for example, and may include a volatile memory and/or a non-volatile memory. In an example where the shader module 723 and the super-sampler module 727 are included in the same GPU 720 as in the illustrated example, the shader module 723 and the super-sampler module 727 may share the same scheduler module 725 and the same graphics memory 729.

The graphics memory 729 may fetch a tile frame (a tile frame to be rendered) to be input to the shader module 723 from the system memory 730 and store the tile frame, and store a rendered tile frame. The graphics memory 729 may store tile frames input to the shader module 723 and the super-sampler module 727, and rendered tile frames output from the shader module 723 and the super-sampler module 727, respectively. As the graphics memory 729 is provided, the memory access to the system memory 730 may be reduced during shading and super-sampling processing.

The graphics memory 729 may store a rendered tile frame including color values of a portion of pixels shaded by the shader module 723, and color values of other pixels determined by super-sampling processing of the super-sampler module 727. In an example, the rendered tile frame may be a tile frame in which the color values of all pixels are determined similar to the tile frame 410 as discussed above in greater detail with respect to FIG. 4. In an example, when the super-sampling processing is completed by super-sampler module 727, the super-sampler module 727 may transmit a signal informing the graphics memory 729 of the completion of super-sampling processing, and the graphics memory 729 may transmit the rendered tile frame to the system memory 730 in response to receiving the signal.

The system memory 730 may store commands and data transmitted between the control processor 710 and the GPU 720. After the tile frame is processed by GPU 720, the processed tile frame may be stored in the system memory 730. The system memory 730 may receive the tile frame rendered by the image rendering apparatus from the graphics memory 729 and store the received tile frame. The system memory 730 may store an output frame (e.g., the output frame 130 of FIG. 1) in which rendered tile frames are combined.

Figure 8:
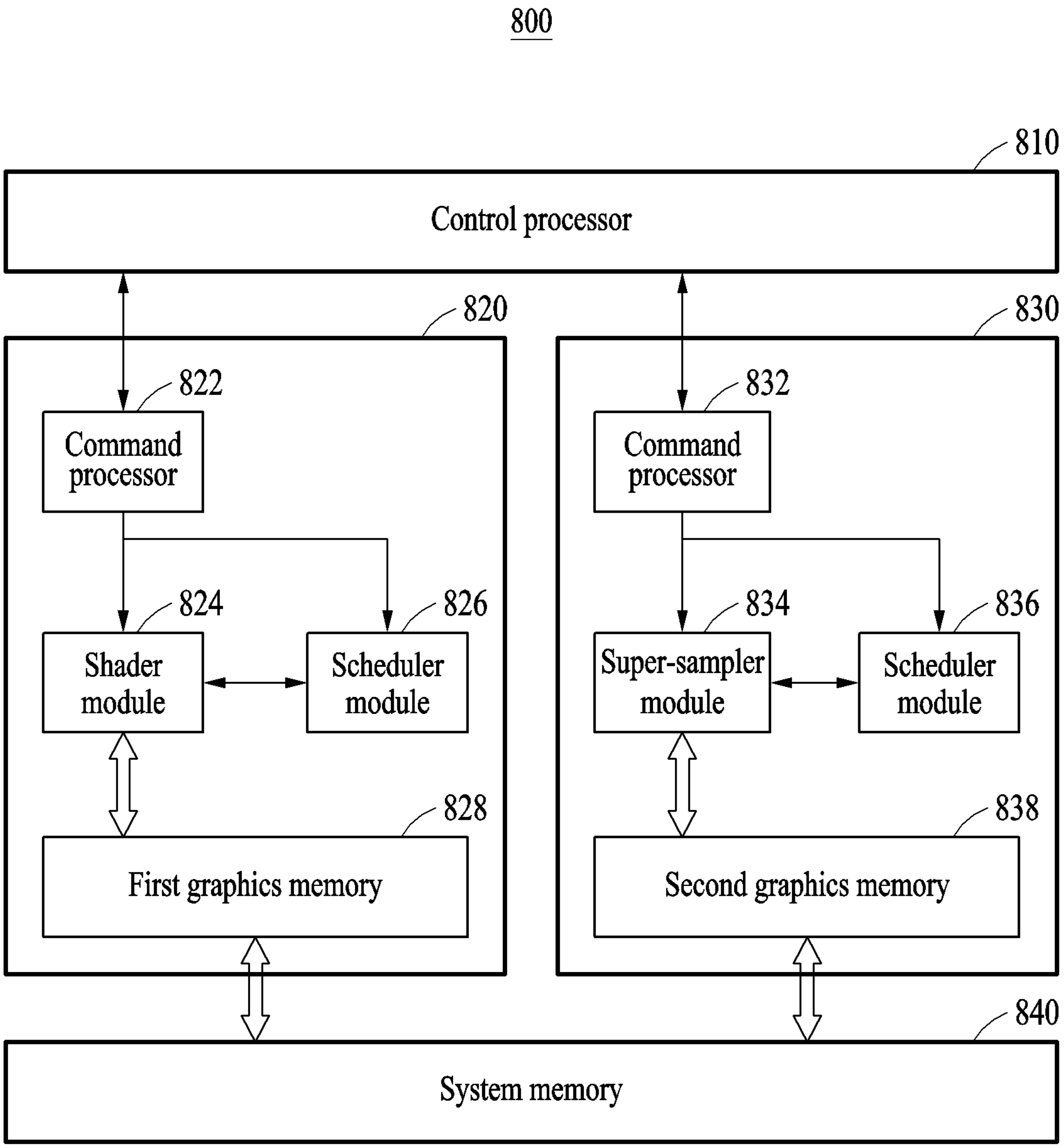
FIG. 8 illustrates example configurations of an image rendering apparatus according to one or more embodiments.

FIG. 8 illustrates example configurations of an image rendering apparatus according to one or more embodiments.

Referring to FIG. 8, in a non-limiting example, an electronic apparatus 800 (e.g., an image rendering apparatus such as the image rendering apparatus 100 of FIG. 1) may include a control processor 810, a GPU 820 configured to perform image rendering based on the control of the control processor 810, and a super-sampling processing unit 830. The image rendering apparatus may include one or more GPUs 820 and super-sampling processing units 830. In an example, shading and super-sampling processing may be performed on different devices (or components). In an example, some of the components may be omitted from the image rendering apparatus or another component may be added to the image rendering apparatus.

In an example, the control processor 810 may control the GPU 820 and the super-sampling processing unit 830. The control processor 810 may transmit a rendering-related command to the GPU 820. In an example, the control processor 810 may include a CPU. The control processor 810 may execute software to control a component of the image rendering apparatus connected to the control processor 810, and may perform a variety of data processing or operations. The control processor 810 may perform the operations performed by the control processor 710 of FIG. 7.

The GPU 820 may perform shading on a tile frame. In an example, the GPU 820 may include a command processor 822, a shader module 824, a scheduler module 826, and a first graphics memory 828.

The command processor 822 may process a command received from the control processor 810 and control the execution of the command in the GPU 820. The command processor 822 may analyze the received command and distribute rendering-related tasks to the shader module 824 and the scheduler module 826 based on a result of the analyzing.

The scheduler module 826 may schedule a tile frame to be shaded by the shader module 824. The scheduler module 826 may control the processing order of tile frames processed by the shader module 824. The scheduler module 826 may select a tile frame that may be processed by the shader module 824 by checking states of tile frames to be rendered, and transmit information about the selected tile frame to the shader module 824.

The shader module 824 may perform shading on a tile frame to generate a pre-processed tile frame (e.g., the tile frame 310 of FIGS. 3 and 4). The shader module 824 may determine color values of a portion of pixels by performing shading on the portion of pixels included in a tile frame corresponding to a partial region of an input frame. In an example, the shader module 824 may perform the shading on pixels in an edge region of a tile frame to determine color values of the pixels in the edge region. In an example, the shader module 824 may perform the shading on all pixels included in the edge region by the shader module 824 to determine color values of all pixels in the edge region. The shader module 824 may perform the shading on a portion of pixels among pixels included in a non-edge region other than the edge region in the tile frame to determine color values of the portion of pixels in the non-edge region.

The first graphics memory 828 may store data of a tile frame. In an example, the first graphics memory 828 may function as a buffer, and may include a volatile memory and/or a non-volatile memory. The first graphics memory 828 may store color values of a portion of pixels (e.g., all pixels in the edge region and a portion of pixels in the non-edge region) as determined by the shading of the shader module 824. The first graphics memory 828 may store the pre-processed tile frame that is shaded by the shader module 824, and transmit the pre-processed tile frame to the system memory 840. When shading of the tile frame is completed by the shader module 824, the shader module 824 may transmit a signal informing the completion of shading to the first graphics memory 828. In response to the reception of the signal, the first graphics memory 828 may transmit the pre-processed tile frame received from the shader module 824 to the system memory 840.

The pre-processed tile frame stored in the system memory 840 may be shared with the super-sampling processing unit 830, and allocated to a second graphics memory 838 of the super-sampling processing unit 830. The super-sampling processing unit 830 may perform super-sampling processing on the pre-processed tile frame that is shaded by the shader module 824. In an example, the super-sampling processing unit 830 may include a command processor 832, a super-sampler module 834, a scheduler module 836, and the second graphics memory 838.

The command processor 832 may process a command received from the control processor 810 and control the execution of the command in the super-sampling processing unit 830. The command processor 832 may analyze the received command and distribute rendering-related tasks to the super-sampler module 834 and the scheduler module 836 based on a result of the analyzing.

The scheduler module 836 may schedule a tile frame to be super-sampled by the super-sampler module 834. The scheduler module 836 may control the processing order of tile frames processed by the super-sampler module 834. The scheduler module 836 may select a tile frame that may be processed by the super-sampler module 834 by checking states of tile frames to be rendered, and transmit information about the selected tile frame to the super-sampler module 834.

The super-sampler module 834 may perform super-sampling processing on the pre-processed tile frame that is shaded by the shader module 824. The super-sampler module 834 may generate a tile frame (e.g., the tile frame 410 of FIG. 4) that is super-sampled by using the pre-processed tile frame as an input. The super-sampler module 834 may perform neural network-based super-sampling processing on other pixels in the non-edge region other than the portion of pixels that are shaded, among all pixels included in the tile frame to determine color values of the other pixels. The super-sampler module 834 may perform the super-sampling processing based on the color values of the pixels in the edge region and the color values of a portion of pixels in the non-edge region to determine the color values of other pixels in the non-edge region (pixels with color values that are not determined by shading by the shader module).

The second graphics memory 838 may store data of a tile frame. In an example, the second graphics memory 838 may function as a buffer, and may include a volatile memory and/or a non-volatile memory. The second graphics memory 838 may store color values of other pixels (pixels with color values that are not determined by shading by the shader module) in the non-edge region determined by the super-sampling processing of the super-sampler module 834. The second graphics memory 838 may store the tile frame that is super-sampled by the super-sampler module 834, and transmit the super-sampled tile frame to the system memory 840. When super-sampling processing of the tile frame is completed by the super-sampler module 834, the super-sampler module 834 may transmit a signal informing the completion of super-sampling processing to the second graphics memory 838. In response to the reception of the signal, the second graphics memory 838 may transmit the super-sampled tile frame from the super-sampler module 834 to the system memory 840.

The system memory 840 may be connected to the first graphics memory 828 of the GPU 820 and the second graphics memory 838 of the super-sampling processing unit 830. Data of the tile frame may be shared between the first graphics memory 828 and the second graphics memory 838 via the system memory 840. In an example, the data may move between the first graphics memory 828 and the second graphics memory 838 in the unit of tile frame (or a plurality of tile frames) via the system memory 840. The system memory 840 may store a rendered tile frame including color values of a portion of pixels shaded by the shader module 824 and color values of other pixels determined by super-sampling processing of the super-sampler module 834.

The various examples described herein may be implemented in the form of a chip or software including a circuit and mounted on an electronic device. An electronic device may be, for example, a mobile communication terminal, smartphone, tablet personal computer (PC), notebook, personal digital assistant (PDA), wearable device (e.g., a virtual reality (VR) device or augmented reality (AR) device), server, television, monitor, digital camera, or PC.

The electronic apparatus, processors, memory, neural networks, CPU's, GPU's, image rendering apparatus 100, neural network 510, electronic apparatus 700, processor 710, GPU 720, command processor 721, shader module 723, scheduler module 725, super-sampler module 727, graphic memory 729, system memory 730, electronic apparatus 800, control processor 810, GPU 820, super-sampling processing units 830, command processor 822, shader module 824, scheduler module 826, first graphics memory 828, super-sampling processing unit 830, command processor 832, shader module 834, scheduler module 836, second graphics memory 838, and system memory described herein and disclosed herein described with respect to FIGS. 1-8 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:

determining first color values of a portion of pixels of plural pixels, the portion of pixels being in a tile frame corresponding to a partial region of an input frame, the tile frame including an edge region and a non-edge region, by performing shading using a shader module on the portion of pixels included;

determining second color values of other pixels in the non-edge region, the other pixels being pixels of the plural pixels not included in the portion of pixels of the tile frame, by performing neural network-based super-sampling processing on the other pixels; and determining a rendered tile frame comprising the first color values of the portion of pixels and the second color values of the other pixels, wherein the determining of the first color values of the portion of pixels comprises determining edge color values of pixels in the edge region by performing shading using the shader module on the pixels in the edge region of the tile frame, and wherein the super-sampling processing for determining the second color values is performed without using color values of pixels included in other tile frames located around the tile frame.

2. The method of claim 1, wherein the determining of the first color values further comprises determining non-edge color values of a non-edge portion of pixels in the non-edge region by performing shading using the shader module on the non-edge portion of pixels, the non-edge portion of pixels being included in the non-edge region, and the non-edge region being a region other than the edge region of the tile frame.

3. The method of claim 2, wherein the determining of the second color values comprises performing the super-sampling processing based on the edge color values and the non-edge color values.

4. The method of claim 2, wherein a number of the non-edge portion of pixels to be shaded using the shader module is determined based on one of an image upscaling ratio, a frame rate, or an estimated amount of resource consumption.

5. The method of claim 1, wherein the determining of the second color values comprises performing the super-sampling processing without using a third color value of a pixel included in another tile frame positioned around the tile frame.

6. The method of claim 1, wherein the determining of the edge color values comprises determining all-edge color values of all pixels in the edge region by performing the shading using the shader module on the all pixels included in the edge region.

7. The method of claim 1, further comprising, after the second color values are determined, transmitting the rendered tile frame including the first color values and the second color values to a system memory.

8. The method of claim 1, wherein the determining of the first color values is performed by the shader module included in a graphics processing unit (GPU), and wherein the determining of the second color values is performed by a super-sampler module configured to perform the super-sampling processing.

9. The method of claim 8, wherein the super-sampler module is included in the GPU.

10. A non-transitory computer-readable storage medium storing instructions that, when executed by a processor, cause the processor to perform the method of claim 1.

11. An electronic apparatus, comprising:
a control processor; and
a graphics processing unit (GPU) configured to perform image rendering based on control of the control processor,
wherein the GPU comprises:
processors configured to execute instructions; and
a memory storing the instructions, wherein execution of the instructions configures the processors to:
determine first color values of a first portion of pixels, the first portion of pixels being pixels of plural pixels in a tile frame corresponding to a partial region of an input frame, the tile frame including an edge region and a non-edge region, by performing shading on the first portion of pixels; and
determine second color values of second pixels of the non-edge region, the second portion of pixels being pixels of the plural pixels not included in the first portion, by performing neural network-based super-sampling processing on the second portion of pixels; and
a graphics memory configured to store a rendered tile frame comprising the first color values of the first portion of pixels and the second color values of the second portion of pixels,
wherein the determining of the first color values comprises determining edge color values of pixels in the edge region by performing shading on the pixels in the edge region of the tile frame, and
wherein the super-sampling processing for determining the second color values is performed without using color values of pixels included in other tile frames located around the tile frame.

12. The electronic apparatus of claim 11, wherein the determining of the first color values further comprises determining non-edge color values of a third portion of pixels in the non-edge region by performing shading on the third portion of pixels, the non-edge region being a region other than the edge region of the tile frame.

13. The electronic apparatus of claim 12, wherein the determining of the second color value comprises determining the second color values by performing the super-sampling processing based on the edge color values and the non-edge color values.

14. The electronic apparatus of claim 11, wherein the determining of the second color value comprises performing the super-sampling processing without using a third color value of a pixel included in another tile frame positioned around the tile frame.

15. The electronic apparatus of claim 11, wherein the determining of the second color value comprises determining all-edge color values of all pixels in the edge region by performing the shading on the all pixels included in the edge region.

16. The electronic apparatus of claim 11, further comprising:
a system configured to receive the tile frame rendered by the electronic apparatus from the graphics memory, and store an output frame obtained by combining rendered tile frames.

17. An electronic apparatus, comprising:
a graphics processing unit (GPU) comprising:
processors configured to execute instructions; and
a memory storing the instructions, wherein execution of the instructions configures the processors to:
determine first color values of a first portion of pixels by performing shading on the first portion of pixels, the first portion of pixels being pixels of plural pixels included in a tile frame corresponding to a partial region of an input frame, the tile frame including an edge region and a non-edge region; and
determine second color values of a second portion of pixels in the non-edge region, the second portion of pixels being pixels of the plural pixels not included in the first portion, by performing neural network-based super-sampling processing on the second portion of pixels;
a first graphics memory configured to store the determined color values of the portion of pixels;
a second graphics memory configured to store the determined color values of the second portion of pixels; and
a system memory connected to the first graphics memory and the second graphics memory,
wherein the determining of the first color values comprises determining edge color values of pixels in the edge region by performing shading on the pixels in the edge region of the tile frame, and
wherein the super-sampling processing on the second portion of pixels is performed without using color values of pixels included in other tile frames located around the tile frame.

18. The electronic apparatus of claim 17, wherein the determining of the first color values further comprises determining non-edge color values of a third portion of pixels in the non-edge region by performing shading on the third portion of pixels of pixels, the non-edge region being a region other than the edge region of the tile frame.

19. The electronic apparatus of claim 18, wherein the determining of the second color value comprises determining the second color values by performing the super-sampling processing based on the edge color values and the non-edge color values.

20. The electronic apparatus of claim 17, wherein the system memory is configured to store a rendered tile frame comprising the first color values and the second color values.

* * * * *